United States Patent

Winks

Patent Number: 5,993,354
Date of Patent: Nov. 30, 1999

[54] TRANSFER CASE SHIFT CONTROL SYSTEM USING AUTOMATIC SHUTDOWN RELAY CIRCUIT

[75] Inventor: Joseph A. Winks, West Monroe, N.Y.

[73] Assignee: New Venture Gear, Inc., Troy, Mich.

[21] Appl. No.: 09/237,179

[22] Filed: Jan. 25, 1999

[51] Int. Cl.$^6$ ................................................. B60K 41/04
[52] U.S. Cl. ......................... 477/107; 477/101; 477/109
[58] Field of Search .................................. 477/101, 102, 477/107, 109

[56] References Cited

U.S. PATENT DOCUMENTS

| | | | |
|---|---|---|---|
| 3,851,723 | 12/1974 | Pagdin | 477/107 X |
| 5,383,824 | 1/1995 | Runge et al. | 477/107 X |
| 5,522,777 | 6/1996 | Baxter et al. | 477/109 X |

Primary Examiner—Sherry L. Estremsky
Attorney, Agent, or Firm—Harness, Dickey & Pierce, P.L.C.

[57] ABSTRACT

A transfer case includes an input shaft driven by the output of an engine and transmission, a first output shaft connected to a first driveline, a second output shaft connected to a second driveline, and a power transfer mechanism for transferring drive torque from the input shaft to at least one of the output shafts. The power transfer mechanism includes a gear reduction unit driven by the input shaft and a range clutch operable for engaging the gear reduction unit to establish high-range and low-range drive modes between the input shaft and the first output shaft. A transfer case shift control system controls actuation of the range clutch during motive operation of the motor vehicle, thereby permitting on-the-move shifting of the transfer case between its high-range and low-range drive modes. The transfer case shift control system includes a mode selector for generating a mode signal, a relay circuit interconnected between the engine's fuel and ignition systems and a powertrain control module of the motor vehicle, and a transfer case control module receiving the mode signal and vehicle input signals from the powertrain control module. The transfer case module generates a control signal based on the mode signal and the input signals and, if necessary, sends the control signal to the relay circuit for varying characteristics of the vehicle's fuel and ignition systems to reduce the amount of engine torque delivered to the input shaft independent of the powertrain control module. Thereafter, the transfer case control module generates a shift signal for actuating the range clutch to establish the selected one of the high-range and low-range drive modes.

22 Claims, 13 Drawing Sheets

TRANSFER CASE SHIFT CONTROL SYSTEM USING AUTOMATIC SHUTDOWN RELAY CIRCUIT

BACKGROUND OF THE INVENTION

The present invention relates generally to two-speed transfer cases for use in four-wheel drive vehicles. More particularly, the present invention relates to a control system for shifting the transfer case on-the-move between high-range and low-range drive modes.

The drivetrain in many light-duty and sport-utility vehicles includes a transfer case for transmitting drive torque from the engine and transmission to all four of the wheels, thereby establishing a four-wheel drive mode of operation. To accommodate differing road surfaces and conditions, many transfer cases are equipped with a gear reduction unit which can be selectively shifted by the vehicle operator to establish four-wheel high-range and low-range drive modes. In many instances, however, the transfer case can not be shifted between its four-wheel high-range and low-range drive modes unless the vehicle is stopped and the transmission is in neutral. Unfortunately, the need to stop the vehicle prior to such "range" shifting is inconvenient, particularly upon encountering road conditions or surface terrains where continuation of the vehicle's rolling momentum would assist in overcoming the conditions encountered.

To alleviate this inconvenience, some gear reduction units are equipped with synchronizer clutches which permit the vehicle operator to shift from the four-wheel low-range drive mode into the four-wheel high-range drive mode without stopping the vehicle. For example, U.S. Pat. No. 5,054,335 discloses a transfer case equipped with a synchronized range shift arrangement for on-the-move shifting of a layshaft-type gear reduction unit. Alternatively, commonly-owned U.S. Pat. No. 5,346,442 discloses a transfer case having a synchronized range shift arrangement for on-the-move shifting of a planetary-type gear reduction unit. In addition, commonly-owned U.S. Pat. No. 5,655,986 discloses a transfer case equipped with a planetary-type gear reduction unit which permits synchronized shifting into and out of the high-range drive mode and low-range drive mode.

In addition to the above-noted mechanically synchronized range shift system, it is also known to electronically control the drivetrain to provide on-the-move range shifting of transfer cases. For example, an electronically-shifted two-speed transfer case is disclosed in U.S. Pat. No. 5,522,777 as having a transfer case control module which receives input signals from the engine control module relating to the current transmission gear, engine speed and vehicle speed. The transfer case control module uses these input signals to generate control signals that are sent back to the engine control module for use in regulating vehicle operation to accommodate on-the-move range shifting. Specifically, the engine control module will control the engine fuel system to modify engine speed and/or shift the transmission gear to match the rotary speed of the transmission output to that of the transfer case output prior to actuation of the range shift mechanism. However, the requirement to integrate such a transfer case control system into the existing circuitry of conventional engine control modules increases the cost and complexity of the four-wheel drive system.

In view of the substantial interest in transfer cases equipped with on-the-move range shift systems, a recognized need exists to develop electronically-controlled range shift systems for use with four-wheel drive transfer cases that further advance the current technology.

SUMMARY OF THE INVENTION

Accordingly, an object of the present invention is to provide a control system for controlling on-the-move shifting of a two-speed transfer case between high-range and low-range drive modes.

The present invention is generally directed to a four-wheel drive motor vehicle having a two-speed transfer case operable for transmitting drive torque from the engine and transmission to first and second drivelines. The transfer case includes an input shaft driven by the output of the transmission, a first output shaft connected to the first driveline, a second output shaft connected to the second driveline, and a power transfer mechanism for transferring drive torque from the input shaft to at least one of the output shafts. The power transfer mechanism includes a gear reduction unit driven by the input shaft and a range clutch operable for engaging the gear reduction unit to establish first and second drive connections between the input shaft and the first output shaft. When the first drive connection is established, the first output shaft is driven at a first speed ratio relative to the input shaft to define a high-range drive mode. When the second drive connection is established, the first output shaft is driven at a second speed ratio relative to the input shaft to define a low-range drive mode. A transfer case shift control system is provided for controlling actuation of the range clutch during motive operation of the motor vehicle, thereby permitting on-the-move shifting of the transfer case between its high-range and low-range drive modes. The transfer case shift control system includes a mode selector for generating a mode signal indicative of the drive mode selected, a relay circuit interconnected between the engine's fuel and ignition systems and the powertrain control module of the motor vehicle, and a transfer case control module receiving the mode signal and vehicle input signals from the powertrain control module that are indicative of vehicle speed, throttle position and transmission gear. The transfer case module generates a control signal based on the mode signal and the input signals and, if necessary, sends the control signal to the relay circuit for varying characteristics of the vehicle's fuel and ignition systems to reduce the amount of engine torque delivered to the input shaft independent of the powertrain control module. Thereafter, the transfer case control module generates a shift signal for actuating the range clutch to establish the selected one of the high-range and low-range drive modes.

According to another feature of the present invention, the relay circuit interconnected between the engine's fuel and ignition systems and the powertrain control module is an automatic shutdown (ASD) relay circuit. The transfer case control module sends a pulsewidth modulated (PWM) control signal to the ASD relay circuit to regulate engine torque. According to one preferred control scheme, the frequency of the PWM control signal increases in relation to decreases in vehicle speed and its duty-cycle increases in relation to increases in throttle position.

As a further feature of the present invention, the gear reduction unit is a planetary gearset and the range clutch includes a range sleeve that is movable for coupling components of the planetary gearset to the first output shaft for establishing either of the first and second drive connections. Synchronizers may optionally be used in association with the range sleeve for assisting in on-the-move shifting of the transfer case between its high-range and low-range drive modes.

As yet a further feature, the power transfer mechanism of the transfer case includes a drive assembly interconnecting the first and second output shafts such that the range clutch is operable for establishing the first and second drive connections between the input shaft and the drive assembly for supplying drive torque to one or both of the output shafts.

As a related feature, the drive assembly includes an interaxle differential for establishing full-time four-wheel high-range and low-range drive modes.

As another related feature, the drive assembly includes a transfer clutch for selectively or automatically transferring drive torque from the first output shaft to the second output shaft to define part-time or on-demand four-wheel high-range and low-range drive modes.

Additional objects, features and advantages of the present invention will become apparent from studying the following detailed description and appended claims when taken in conjunction with the accompanying drawings.

DETAILED DESCRIPTION OF THE PREFERRED EMBODIMENTS

In general, the present invention relates to a two-speed transfer case of the type used in the drivetrain of a four-wheel drive vehicle and an electronic control system for automatically controlling "on-the-move" shifting of the transfer case between a low-range drive mode and a high-range drive mode during motive operation of the motor vehicle.

Figure 1:
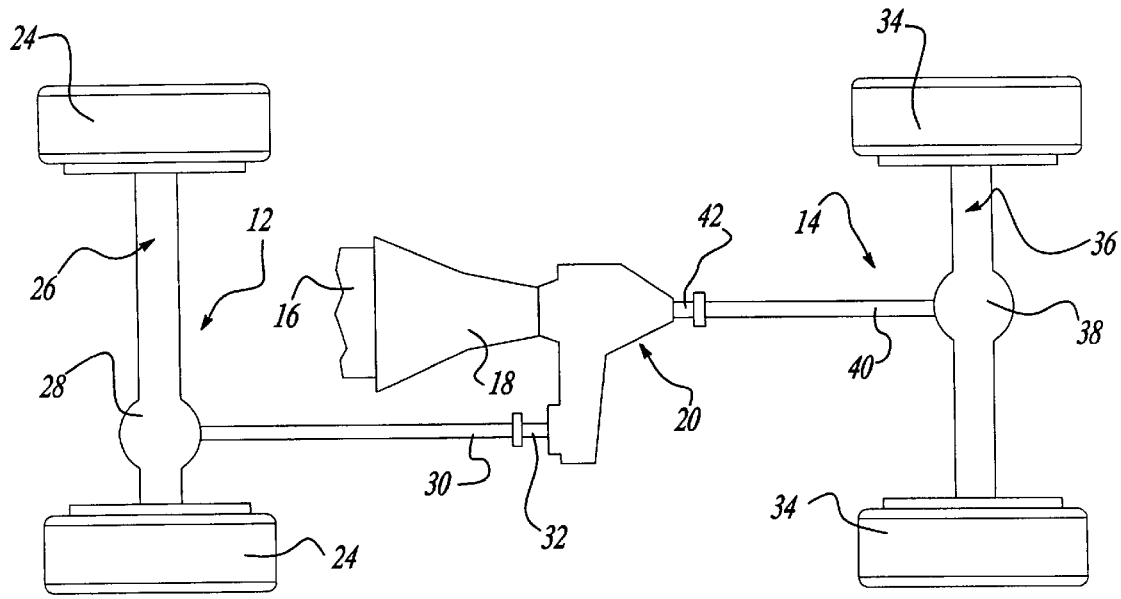
FIG. 1 illustrates the drivetrain of a four-wheel drive motor vehicle equipped with the transfer case shift control system of the present invention.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair or rear wheels 34 connected at opposite ends of a rear axle assembly 36 having a rear differential 38 coupled to one end of a rear propshaft 40, the opposite end of which is interconnected to a rear output shaft 42 of transfer case 20.

Figure 2:
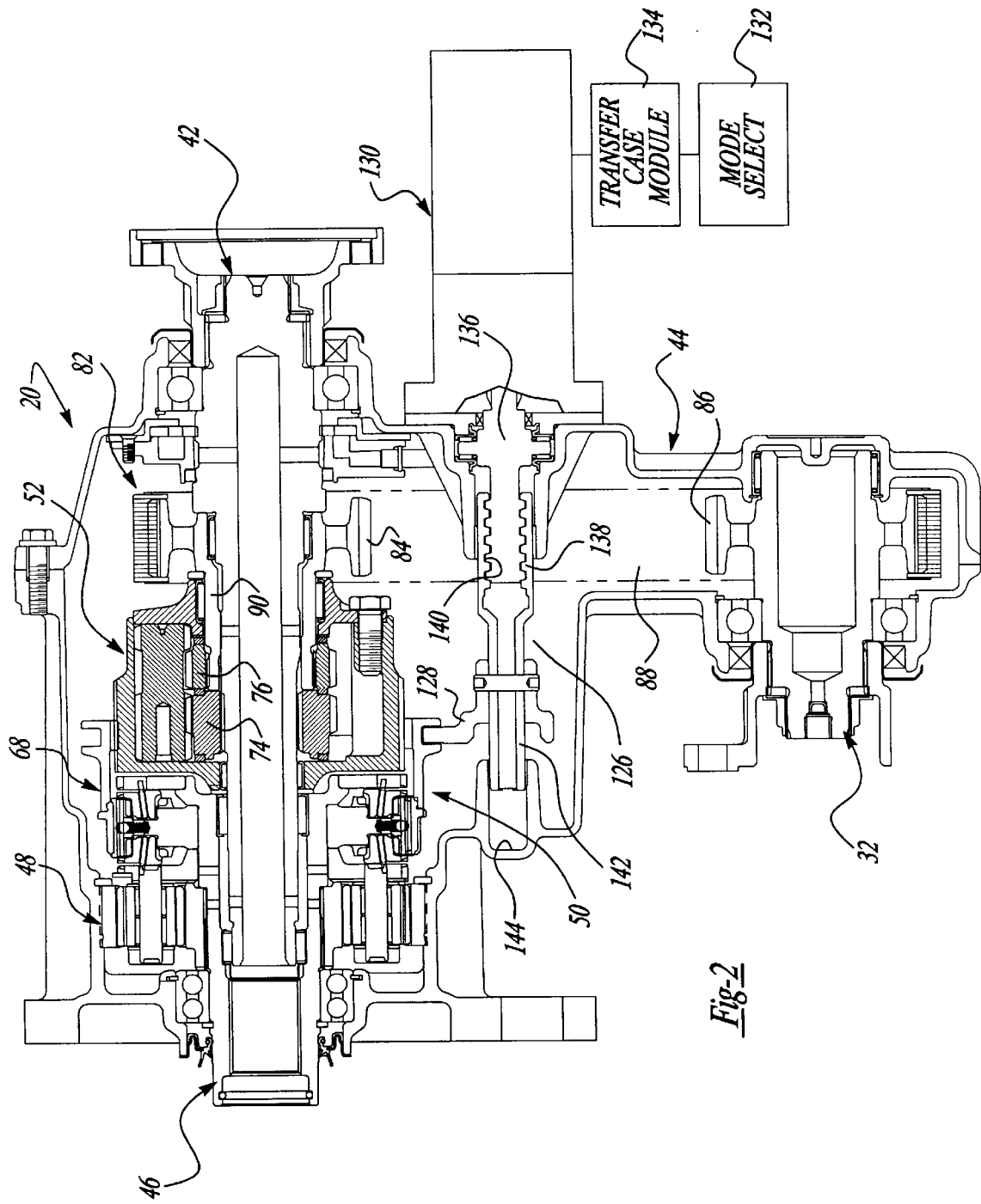
FIG. 2 is a sectional view of a transfer case equipped with a planetary gear assembly and a synchronized range shift mechanism according to the present invention.
Figure 3:
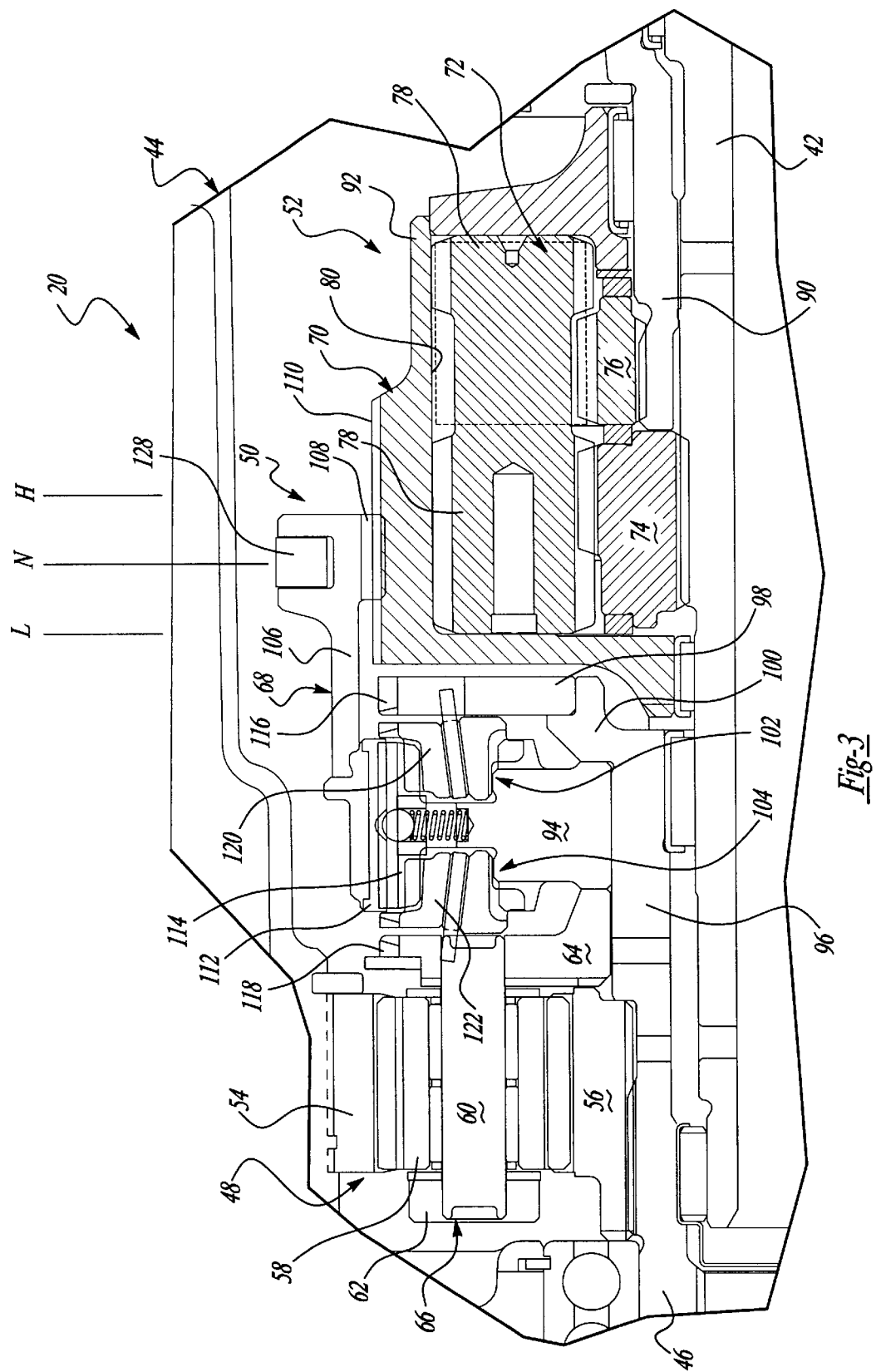
FIG. 3 is a partial sectional view of the planetary gear assembly and the synchronized range shift mechanism shown in FIG. 2.

Referring to FIGS. 2 and 3, transfer case 20 is shown to include a housing 44 and an input shaft 46 rotatably supported from housing 44. Input shaft 46 is adapted to be connected to an output shaft (not shown) of transmission 18 such that both are rotatably driven by engine 16 of the motor vehicle. As seen, rear output shaft 42 is rotatably supported between input shaft 46 and housing 44 while front output shaft 32 is also rotatably supported from housing 44. Transfer case 20 is also shown equipped with a power transfer mechanism including a planetary gearset 48, a synchronized range shift mechanism 50, and a drive assembly 52. In the particular embodiment shown, drive assembly 52 includes an interaxle differential interconnecting rear output shaft 42 and front output shaft 32. Planetary gearset 48 includes a ring gear 54 fixed to housing 44, a sun gear 56 fixed for rotation with input shaft 46, and a set of pinion gears 58 which are each rotatably supported on a pinion shaft 60 and meshed with sun gear 56 and ring gear 54. Each pinion shaft 60 extends between a front carrier ring 62 and a rear carrier ring 64 which are interconnected to define a planet carrier 66.

Planetary gearset 48 functions as a two-speed gear reduction unit which, in conjunction with a range clutch 68 of synchronized range shift mechanism 50, is operable to establish either of a first or second drive connection between input shaft 46 and a carrier assembly 70 of interaxle differential 52. To establish the first drive connection, carrier assembly 70 is coupled by range clutch 68 for common rotation with input shaft 46. Thus, the first drive connection defines a high-range drive mode in which carrier assembly 70 is driven at a first (i.e., direct) speed ratio with respect to input shaft 46. Likewise, the second drive connection is established by range clutch 68 coupling carrier assembly 70 for common rotation with planet carrier 66. The second drive connection defines a low-range drive mode in which carrier assembly 70 is driven at a second (i.e., reduced) speed in response to driven rotation of input shaft 46. A Neutral mode is established when carrier assembly 70 is uncoupled from both input shaft 46 and planet carrier 66. As will be detailed, synchronized range shift mechanism 50 is operable for permitting transfer case 20 to be shifted "on-the-move" between its high-range and low-range drive modes.

Interaxle differential 52 functions to permit speed differentiation and distribute drive torque between front output shaft 32 and rear output shaft 42 so as to establish a differentiated or "full-time" four-wheel drive mode. In this regard, carrier assembly 70, when driven at either of the first and second speed ratios, acts as the input to interaxle differential 52. Interaxle differential 52 also includes a gearset 72 with outputs coupled to front output shaft 32 and rear output shaft 42. According to the particular embodiment shown in FIGS. 2 and 3, gearset 72 includes a second sun gear 74, a third sun gear 76, a set of first pinions 78 meshed with second sun gear 74, and a set of second pinions 79 (shown in phantom) meshed with third sun gear 76. Pinions 78 and 79 are arranged in meshed pairs within a chamber 80 formed in carrier assembly 70. As such, second sun gear 74 acts as a first output and is fixed for rotation with rear output shaft 42. Likewise, third sun gear 76 acts as a second output and is fixed for rotation, via a transfer assembly 82, with front output shaft 32. Transfer assembly 82 is shown to include a drive sprocket 84 rotatably supported on rear output shaft 42, a driven sprocket 86 fixed for rotation with front output shaft 32, and a power chain 88 interconnecting driven sprocket 86 to drive sprocket 84. Third sun gear 76 is fixed to a transfer shaft 90 which, in turn, is fixed to, or integral with, drive sprocket 84. According to the particular embodiment shown, differential 52 is a slip limiting and torque biasing device capable of progressively and automatically limiting excessive speed differentiation between sun gears 74 and 76 due to thrust loading and frictional loading generated by gearset 72 in response to speed differentiation. It should be understood that any type of traditional open differential or limited-slip differential (speed and/or torque sensitive) can be used in substitution for the particular construction shown. As seen, carrier assembly 70 includes a drum housing 92 and an end cap 93 which are interconnected and rotatably supported between rear output shaft 42 and transfer shaft 90.

With continued reference to FIG. 3, synchronized range shift mechanism 50 is shown to include a clutch hub 94 rotatably supported on a tubular segment 96 of input shaft 46, a clutch ring 98 fixed to an annular end segment 100 of input shaft 46, a first synchronizer assembly 102 disposed between clutch hub 94 and clutch ring 98, and a second synchronizer assembly 104 disposed between clutch hub 94 and carrier ring 64. Carrier ring 64 is shown journalled on tubular segment 96 of input shaft 46 with clutch hub 94 axially restrained between end segment 100 and carrier ring 64. Range clutch 68 is a range sleeve 106 having a first set of internal teeth 108 maintained in constant mesh with external teeth 110 formed on drum housing 92 of interaxle differential 52. Range sleeve 106 also includes a second set of internal teeth 112 maintained in constant mesh with external teeth 114 formed on clutch hub 94. Thus, range sleeve 106 is mounted for rotation with drum housing 92 and clutch hub 94 and is supported for bidirectional sliding movement relative thereto.

With range sleeve 106 in a neutral position (denoted by position line "N"), its second set of teeth 112 are disengaged from meshed engagement with clutch teeth 116 on clutch ring 98 and clutch teeth 118 on rear carrier ring 64. First synchronizer assembly 102 is operable for causing speed synchronization between input shaft 46 and carrier assembly 70 in response to movement of range sleeve 106 from its N position toward a high-range position (denoted by position line "H"). Once the speed synchronization process is completed, teeth 112 on range sleeve 106 are permitted to move through the teeth of a blocker ring 120 and into meshed engagement with clutch teeth 116 on front clutch ring 98. Accordingly, with range sleeve 106 positioned in its H position, it couples drum housing 92 to clutch ring 98 such that carrier assembly 70 of interaxle differential 52 is coupled to rotate at the same speed as input shaft 46 for establishing the first drive connection therebetween. Thus, when the first drive connection is established, a full-time four-wheel high-range drive mode is established.

Second synchronizer assembly 104 is operable to cause speed synchronization between range sleeve 106 and planet carrier 66 in response to movement of range sleeve 106 from its N position toward a low-range position (denoted by position line "L"). Once speed synchronization is complete, teeth 112 on range sleeve 106 move through teeth on a blocker ring 122 and into meshed engagement with clutch teeth 118 on carrier ring 64. With range sleeve 106 positioned in its L position, sun gear 56 drives pinion gears 58 about stationary ring gear 54 such that planet carrier 66 and carrier assembly 70 are driven at the reduced speed ratio relative to input shaft 46, thereby establishing the second drive connection and the full-time four-wheel low-range drive mode. When range sleeve 106 is in its N position, no drive torque is transferred to carrier assembly 70, thereby establishing the Neutral mode. Range sleeve 106 is designed such that its sets of teeth 108 and 112 maintain respective engagement with teeth 110 on drum 92 and teeth 114 on hub 94 throughout the entire length of axial travel of range sleeve 106 between its H and L positions.

To provide means for moving range sleeve 106 between its three range positions, transfer case 20 includes a range shift mechanism 126 comprised of a range fork 128 coupled to range sleeve 106, a power-operated actuator 130 for causing axial movement of range fork 128, a mode select operator 132 for permitting the vehicle operator to select a desired drive mode and generate a mode signal indicative thereof, and a transfer case control module 134 adapted to receive the mode signal and cause selective actuation of actuator 130. Actuator 130 is preferably a gearmotor/encoder assembly having a rotary output screw 136 formed with external threads 138 that mesh with internal threads 140 formed in one end of a sector shaft 142, the other end of which is supported in a housing socket 144. Range fork 128 is fixed to shaft 142 such that bi-directional rotation of output screw 136 caused by actuation of actuator 130 results in bi-directional axial translation of shaft 142 and range fork 128, thereby moving range sleeve 106 between its three distinct range positions. The direction and amount of rotation of output screw 136 is controlled in response to an electric shift signal sent to gearmotor/encoder assembly 130 by transfer case control module 134 when the vehicle operator selects a desired drive mode via manipulation of mode select operator 132. The vehicle operator is permitted to select from full-time four-wheel high-range and low-range drive modes and the Neutral mode. Mode select operator 132 can be a gearshift lever or push-button/rotary switches.

Figure 4:
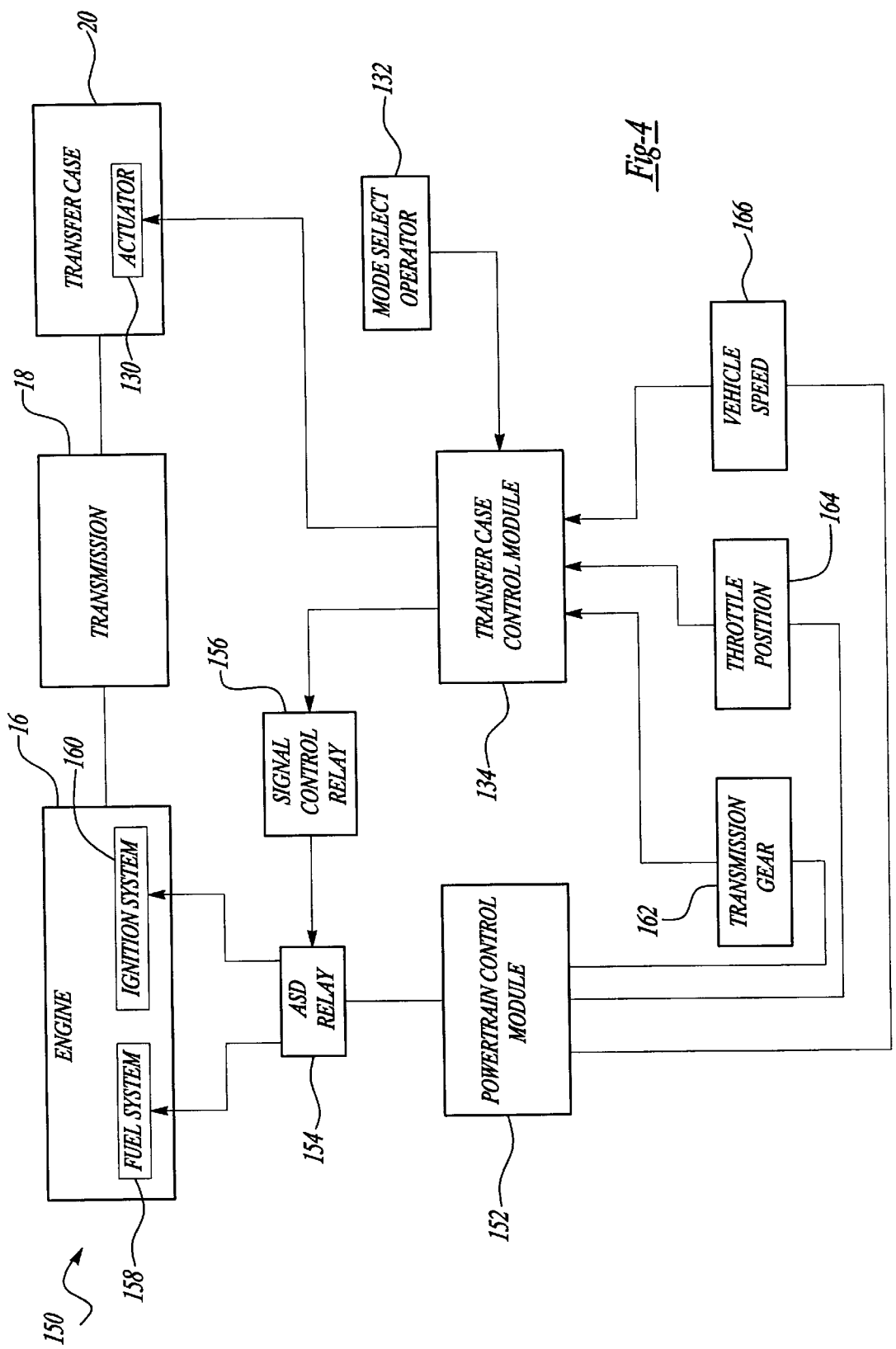
FIG. 4 is a block diagram illustrating the transfer case shift control system of the present invention.

A transfer case shift control system 150 in accordance with the present invention is schematically shown in FIG. 4. In addition to transfer case control module 134, transfer case shift control system 150 is generally comprised of a powertrain control module 152, an automatic shutdown (ASD) relay circuit 154, and a pulsed signal control circuit 156. As noted, transfer case control module 134 controls actuation of gearmotor/encoder assembly 130 of transfer case 20 for selectively moving range sleeve 106 in response to a mode signal sent to transfer case control module 134 from mode select operator 132. ASD relay 154 is provided on most current model motor vehicles and is interconnected between various electrically-powered subsystems of engine 16 and powertrain control module 152. ASD relay 154 is shown schematically to provide power from powertrain control module 152 to a fuel system 158 and an ignition system 160 of engine 16. Transfer case control module 134 receives input signals from powertrain control module 152 indicative of the current transmission gear 162, throttle position 164, and vehicle speed 166. When mode select operator 132 sends a mode signal to transfer case control module 134 indicating a request to shift from one of the high-range and low-range drive modes to the other thereof, transfer case control module 134 uses the input signals to generate an appropriate output signal. Signal control circuit 156 receives the output signal from transfer case control module 134 and delivers a pulsed control signal to ASD relay 154 for variably regulating the electrical power sent to fuel system 158 and ignition system 160. In this way, transfer case module 134 can regulate the control signal sent to ASD relay 154 for regulating the amount of fuel flow and spark to engine 16, thereby controlling engine torque transferred to input shaft 46.

Figure 5:
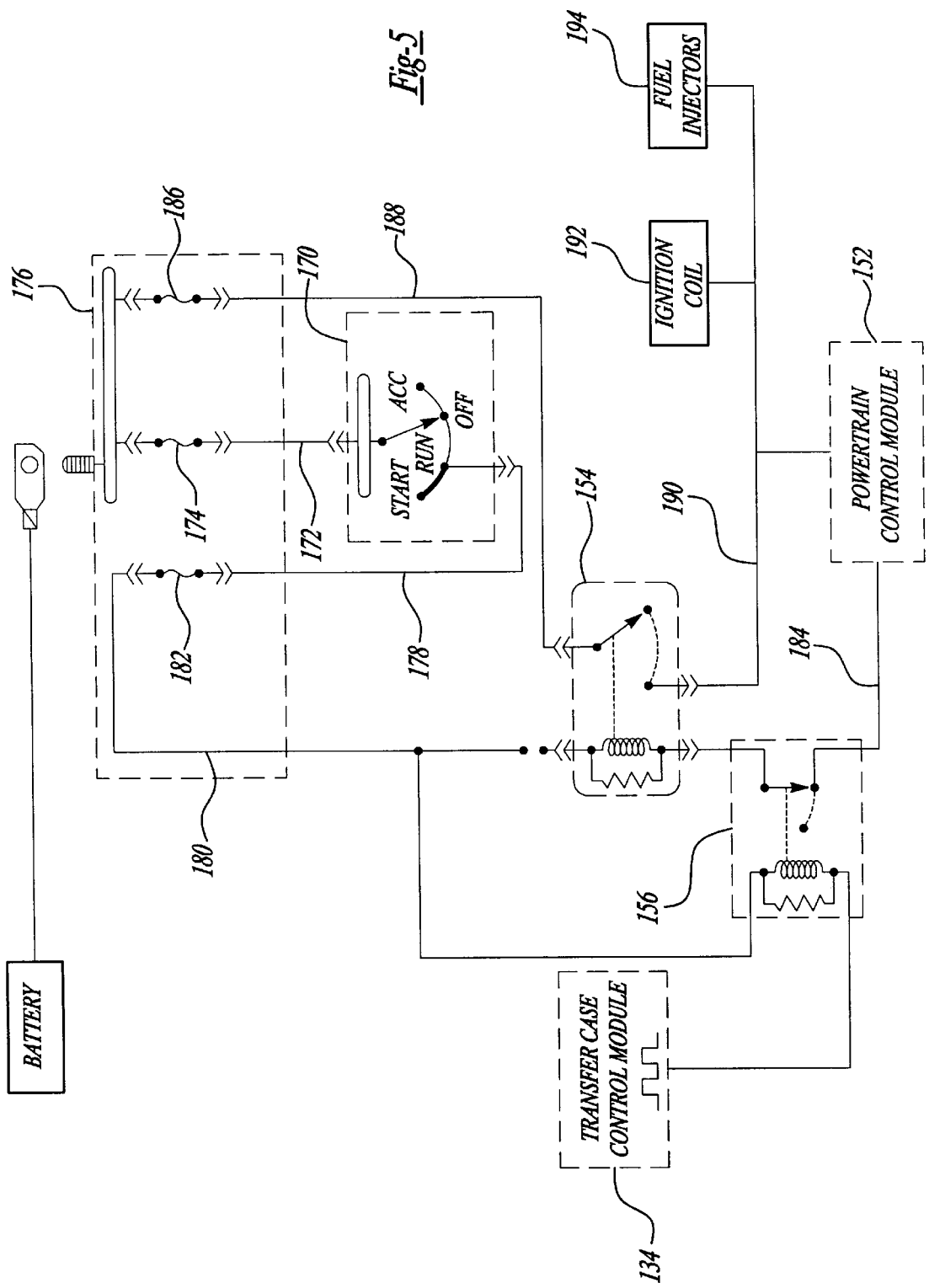
FIG. 5 illustrates an automatic shutdown (ASD) relay circuit applicable for use with the transfer case shift control system of the present invention.

Preferably ASD relay 154 is a solid state relay device as is well known in the art. During normal vehicle operating conditions, the contacts inside of ASD relay 154 are closed, thereby providing power to various engine control circuits, including fuel system 158 and ignition system 160. FIG. 5 depicts an exemplary embodiment of ASD relay 154 of the type incorporated into an engine control circuit of a motor vehicle. While shown isolated from powertrain control module 152, ASD relay 154 can be integrated into the circuitry of powertrain control module 152. When the vehicle's ignition switch 170 is in either the START or RUN positions, it connects a first circuit path 172 from a first fuse 174 in a power distribution center 176 to a second circuit path 178. A third circuit path 180 connects through a second fuse 182 to second circuit path 178, such that it powers or feeds the coil side of ASD relay 154. ASD relay 154 is grounded along a fourth circuit path 184 which connects into powertrain control module 152. Power distribution center 176 also supplies electrical power through a third fuse 186 and a fifth circuit path 188 to the contact side of ASD relay 154. In operation, contacts inside ASD relay 154 close when the relay is grounded such that a sixth circuit path 190 is connected to fifth circuit path 186. Sixth circuit path 190 provides power to ignition coil 192 of ignition system 160 and to fuel injectors 194 of fuel system 158.

Under typical vehicle operating conditions, ASD relay 154 is closed and power is supplied through sixth circuit path 190 to the various subsystems. However, the fuel flow through fuel injectors 194 and the spark generated by ignition coil 192 can be cut when ASD relay 154 is opened. In this regard, the present invention is directed to controllably reducing engine torque prior to actuation of gearmotor/encoder assembly 130 by controlling the output of ASD relay 154. In particular, transfer case control module 134 provides a pulsewidth modulated control signal to signal control circuit 156 which is connected across fourth circuit path 184 of ASD relay 154. Signal control circuit 156 is a normally-closed relay. Thus, the control signal outputted from transfer case control module 134 can cause contacts inside signal control relay 156 to open and interrupt the ground on fourth circuit path 184 to cause ASD relay 154 to open. Since fuel and spark are both inhibited upon opening of ASD circuit 154, there is no engine "backfire" as commonly experienced when only cutting spark. Thus, ASD relay 154 can be controlled using pulsewidth modulation without contact arching or limited frequency response.

Figure 6:
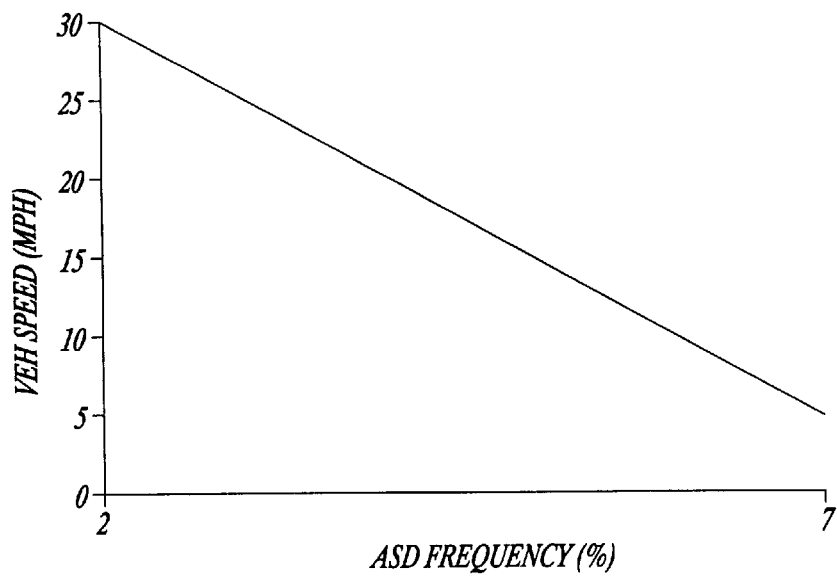
FIG. 6 is a plot showing vehicle speed in relation to the frequency of a pulsewidth modulated control signal delivered to the ASD relay circuit by the transfer case shift control system of the present invention.
Figure 7:
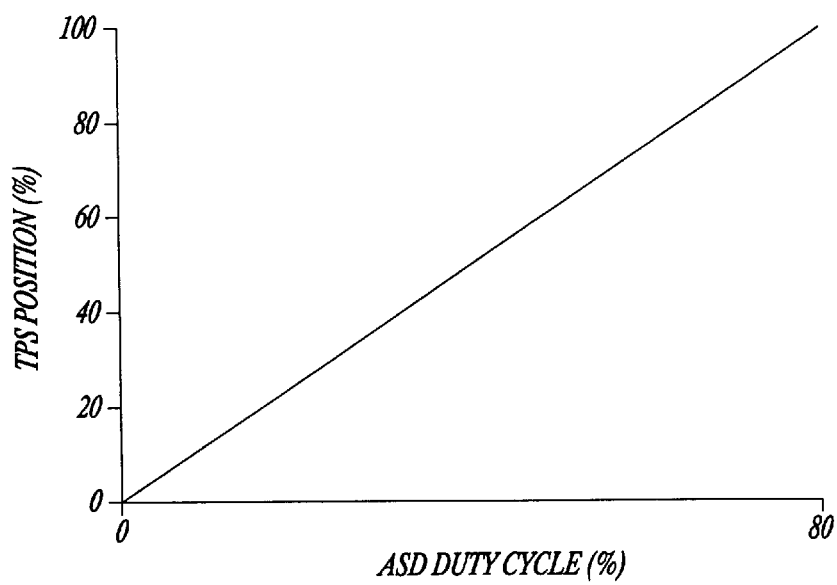
FIG. 7 is a plot showing throttle position in relation to the duty-cycle of a pulsewidth modulated control signal delivered to the ASD relay circuit by the transfer case shift control system of the present invention.

By pulsing the output of ASD relay 154, transfer case shift control system 150 of the present invention is able to control engine torque while selectively shifting transfer case 20 between the high-range and low-range drive modes. More specifically, the PWM control signal sent to signal control relay 156 is varied based on vehicle operating parameters at the time of the requested transfer case shift. Preferably, the frequency of the pulsed control signal is varied as a function of vehicle speed such that as vehicle speed increases, frequency decreases, as is shown in FIG. 6. As a result, transfer case shift control system 150 functions to provide maximum torque interruption at high vehicle speeds as well as to prevent the vehicle from stalling at low vehicle speeds. It is also preferable that the duty cycle of the pulsed control signal be varied as a function of throttle position such that as throttle position increases, the duty cycle "off" time increases, as is shown in FIG. 7. Similarly, these variations in duty cycle provide maximum torque interruption at high open throttle positions and low torque interruptions at low or no throttle input. In addition, if the throttle is closed when a shift is in progress, this approach also prevents the vehicle from stalling.

Each of the linear graphs shown in FIGS. 6 and 7 are modelled using the equation:

$$Y = mX = b$$

where

Y1=throttle position(%) Y2=vehicle speed(mph)

X1=duty cycle(%) X2=frequency (Hz)

The Y-intercept (b) and slope (m) for each of the two equations are empirically derived for optimum performance depending on the particular engine and vehicle dynamics. These predetermined constants are stored in memory for later use by transfer case control module 134. In addition, the equation for each curve is calculated using predetermined minimum and maximum "Y" and "X" values which are based on engine and vehicle dynamics for optimum performance. Upon detection of a mode signal from mode select operator 132, transfer case control module 134 will determine the appropriate control signal to be sent to signal control relay 156 for the current vehicle operating conditions. By using vehicle speed and throttle position inputs, the frequency and duty cycle of the control signal are determined and a pulsed control signal is delivered to signal control relay 156 for pulsing the output of ASD relay 154.

Figure 8B:
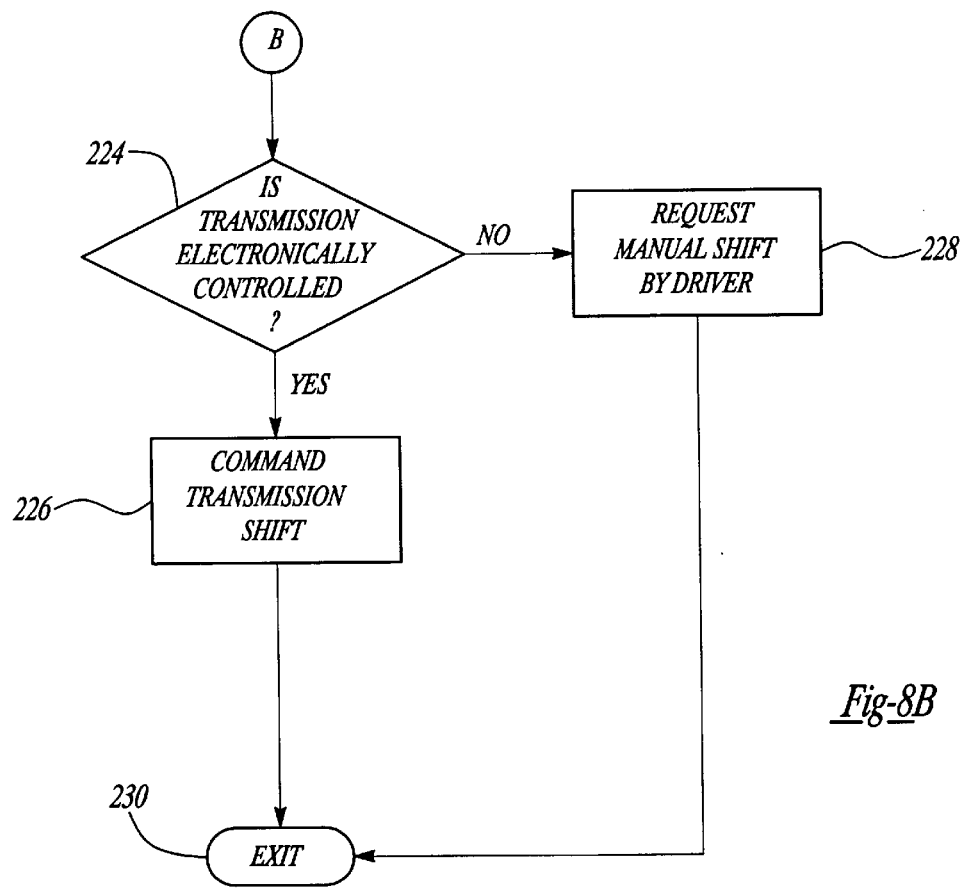
FIGS. 8A–8C are flowcharts showing a sequence of operations associated with the transfer case shift control system for shifting the range shift mechanism of the transfer case.
Figure 8A:
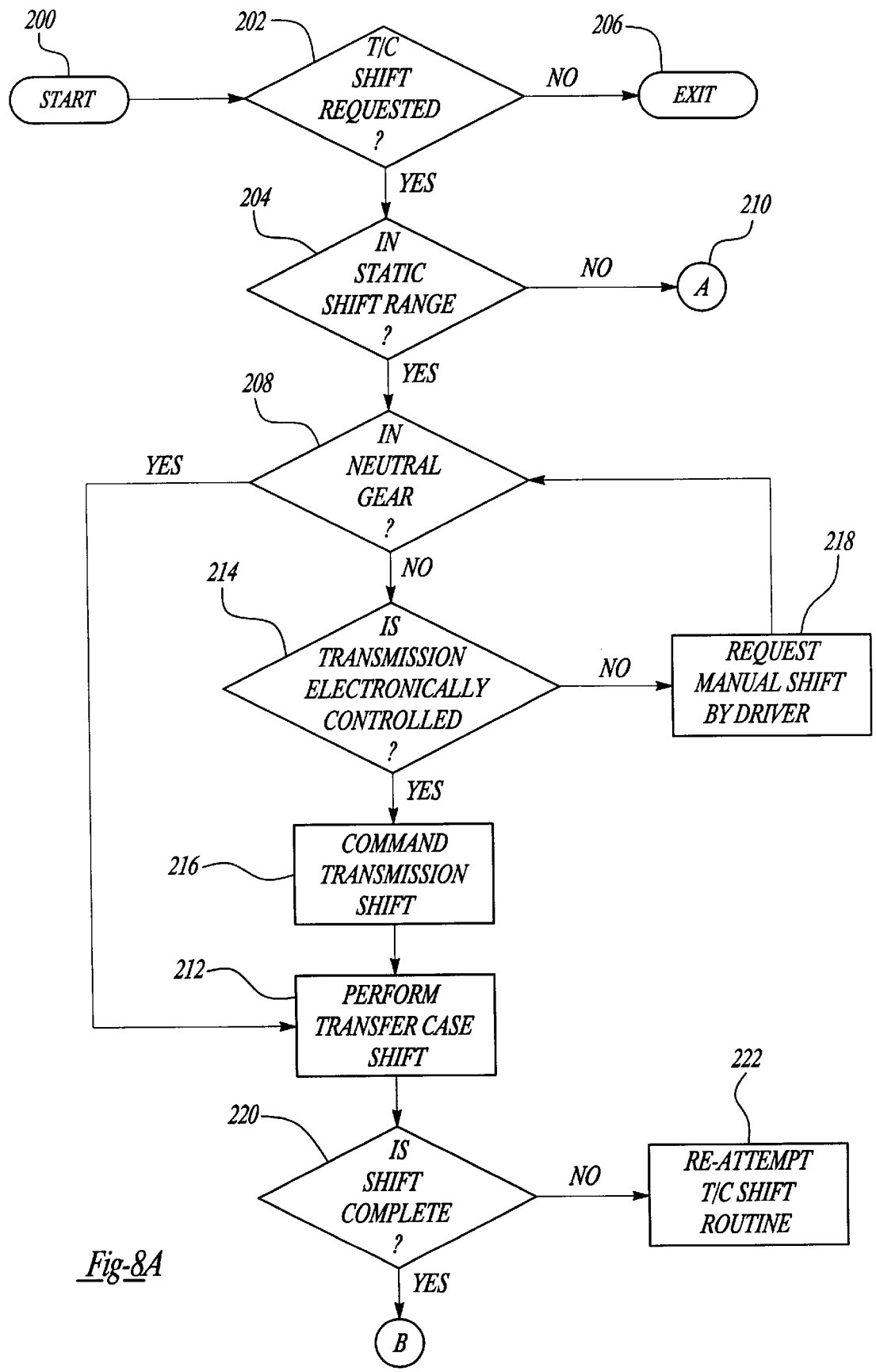
Figure 8C:
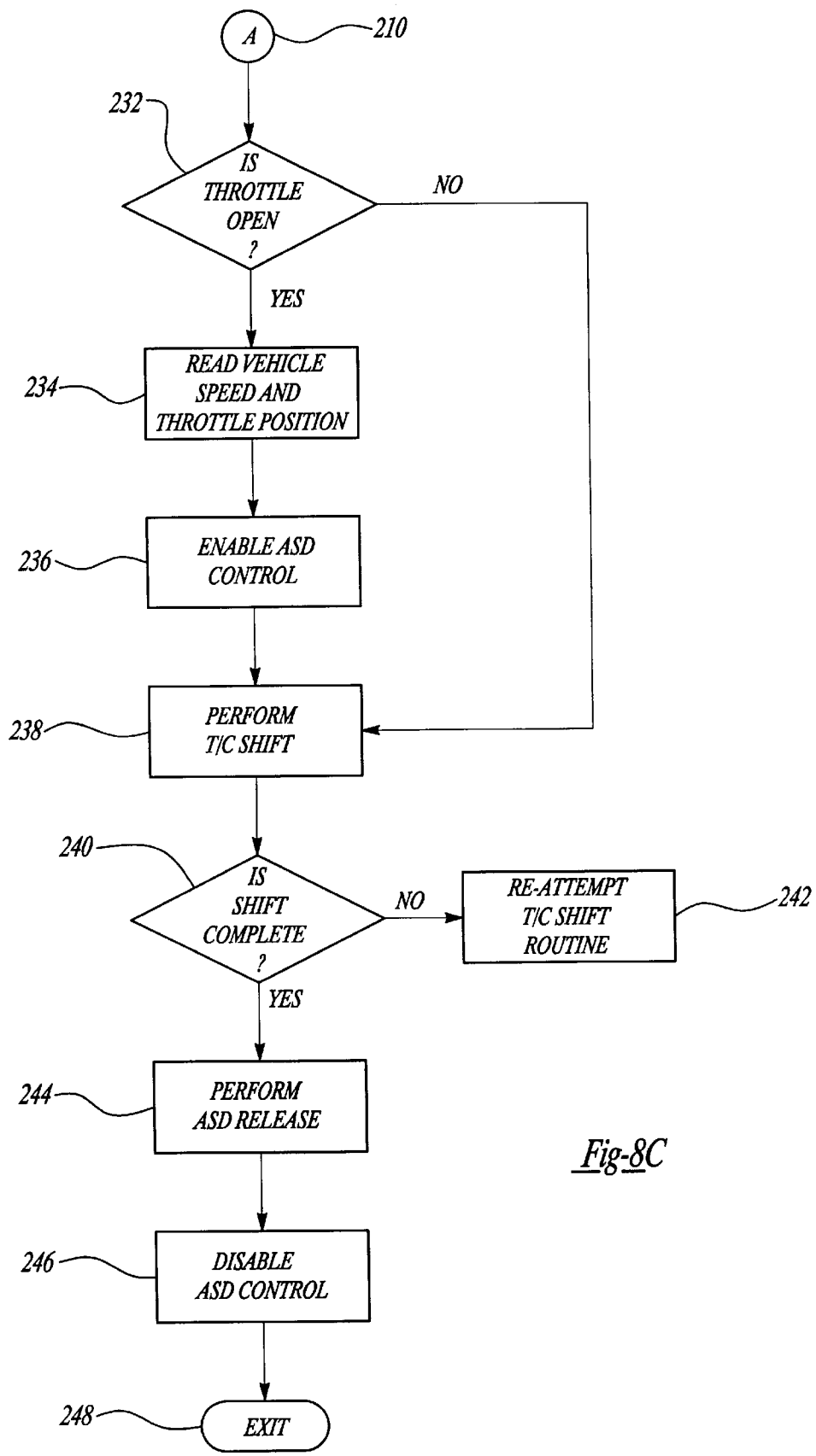

FIG. 8A through 8C are flowcharts showing a more detailed implementation of the logic operations performed by transfer case control module 134 according to a preferred embodiment of the present invention. Start block 200 signifies the beginning of the main loop processing. Decision block 202 determines whether a driver of the motor vehicle has requested a transfer case shift as indicated by an electrical mode signal from mode select operator 132. Transfer case 20 may be shifted from its low-range drive mode into its high-range drive mode or from its high-range drive mode into its low-range drive mode. Regardless, if a range shift has been requested, processing proceeds to decision block 204. If a transfer case shift has not been requested, then main loop processing is terminated in exit block 206.

Decision block 204 determines whether the vehicle speed is in a static shift range (i.e., 0 to 6 mph) or in a dynamic shift range (i.e., mph>6). If the current value of the vehicle speed is in the static shift range, the process proceeds to decision block 208. However, if the current value of the vehicle speed is within the dynamic shift range, then the process proceeds to a dynamic shift routine, identified by block 210 and shown in FIG. 8C. When the vehicle speed is within the static shift range, decision block 208 determines whether transmission 18 is in neutral. If yes, the requested transfer case shift is performed, as indicated by block 212, by transfer case control module 134 sending the appropriate electrical shift signal to gearmotor/encoder assembly 130. However, if transmission 18 is in a gear other than neutral, then decision block 214 determines whether transmission 18 is electronically controlled. For an electronically-controlled transmission 18, block 216 commands a shift into neutral by transmitting an electrical signal to the appropriate control circuit (i.e., a transmission control circuit) in powertrain control module 152, as is well known in the industry. When transmission 18 is not electronically-controlled, then the vehicle operator must manually shift transmission 18 into neutral before transfer case control module 134 will proceed with the requested transfer case shift. In block 218, the driver is visually or audibly requested to manually shift transmission 18 into neutral. Once transfer case control module 134 is signalled that transmission 18 is in neutral gear, processing moves to block 212. Failure by the driver to manually shift the transmission into neutral will cause a failure in the transfer case shift routine after some predetermined timeout period. Once transmission 18 has been shifted (automatically or manually) into neutral, block 212 performs the requested transfer case shift by sending the appropriate shift signal to gearmotor/encoder assembly 130. At the low engine speeds associated with a static shift range condition, it is not necessary for transfer case shift control system 150 to manipulate engine torque prior to performing the shift.

Each of three rotated position of output screw 136 corresponding to the three positions of range sleeve 106 will transmit an encoded signal to transfer case control module 134. Based on this encoded signal, decision block 220 detects when the requested transfer case shift has been completed. If the shift is not completed, a reattempt transfer case shift routine 222 will wait a predetermined time period (i.e., two seconds) before attempting to again shift transfer case 20 into the selected drive mode. As will be apparent to one skilled in the art, this routine should perform a predetermined number of attempts to complete the mode shift before abandoning the shift request. If the transfer case shift remains unsuccessful, then a diagnostic routine may be called and/or a visual indicator may be displayed to notifying the vehicle operator of the failed transfer case shift.

Once the transfer case shift has been completed, transmission 18 is returned to its previous gear position. In FIG. 8B, decision block 224 determines if vehicle transmission 18 is electronically-controlled. If yes, block 226 commands a shift to the previous transmission gear position by transmitting an electrical signal to the appropriate control module. Otherwise, block 228 requests the vehicle operator to manually perform a shift to the previous transmission gear position. In either case, shifting of transfer case 20 for a vehicle operating in the static shift range is completed in exit block 230.

Referring to FIG. 8C, dynamic shift routine 210 is shown for permitting on-the-move range shifting of transfer case 20 when the vehicle speed is within the dynamic shift range. Initially, decision block 232 determines whether the throttle is in an opened or closed position based on throttle position signal 164. When the throttle is closed, there is no need to control engine torque during a shift of transfer case 20, and therefore the shift can be commanded in block 238. However, when the throttle is open (as is most often the case), engine torque must be reduced to minimize the torque load exerted on the synchronizers within transfer case 20. Therefore, while a synchronized shift of transfer case 20 is in progress, transfer case shift control system 150 of the present invention controls engine torque via pulsed control of the output of ASD relay circuit 154. Block 234 determines the current vehicle speed and throttle position (i.e., percentage open). Typically, this information is readily available to transfer case control module 134 via inputs from powertrain control module 152. In accordance with the above discussion, block 236 calculates the frequency and duty-cycle of a pulsewidth modulated control signal which is, in turn, used to pulse the output of ASD circuit 154. Once engine torque has been reduced, transfer case control module 134 commands gearmotor/encoder assembly 130 to move range sleeve 106 for shifting transfer case 20 into the selected drive mode, as indicated by block 238. At decision block 240, transfer case control module 134 determines whether the selected shift has been completed. If the encoder position of output screw 126 indicates that the shift was unsuccessful, a reattempt transfer case shift routine 242 performs as previously discussed.

Once decision block 240 deems the transfer case shift complete, ASD control can be terminated. Rather than abruptly restoring engine torque, block 244 executes an ASD release routine for gradually returning the vehicle to its previous operating conditions. For instance, the duty-cycle of the control signal can be incrementally reduced over a predetermined time period until the duty-cycle reaches zero, thereby ensuring a smooth return to normal vehicle operating conditions. At this point, ASD control is disabled at block 246 and processing can be terminated at exit block 248.

Figure 9:
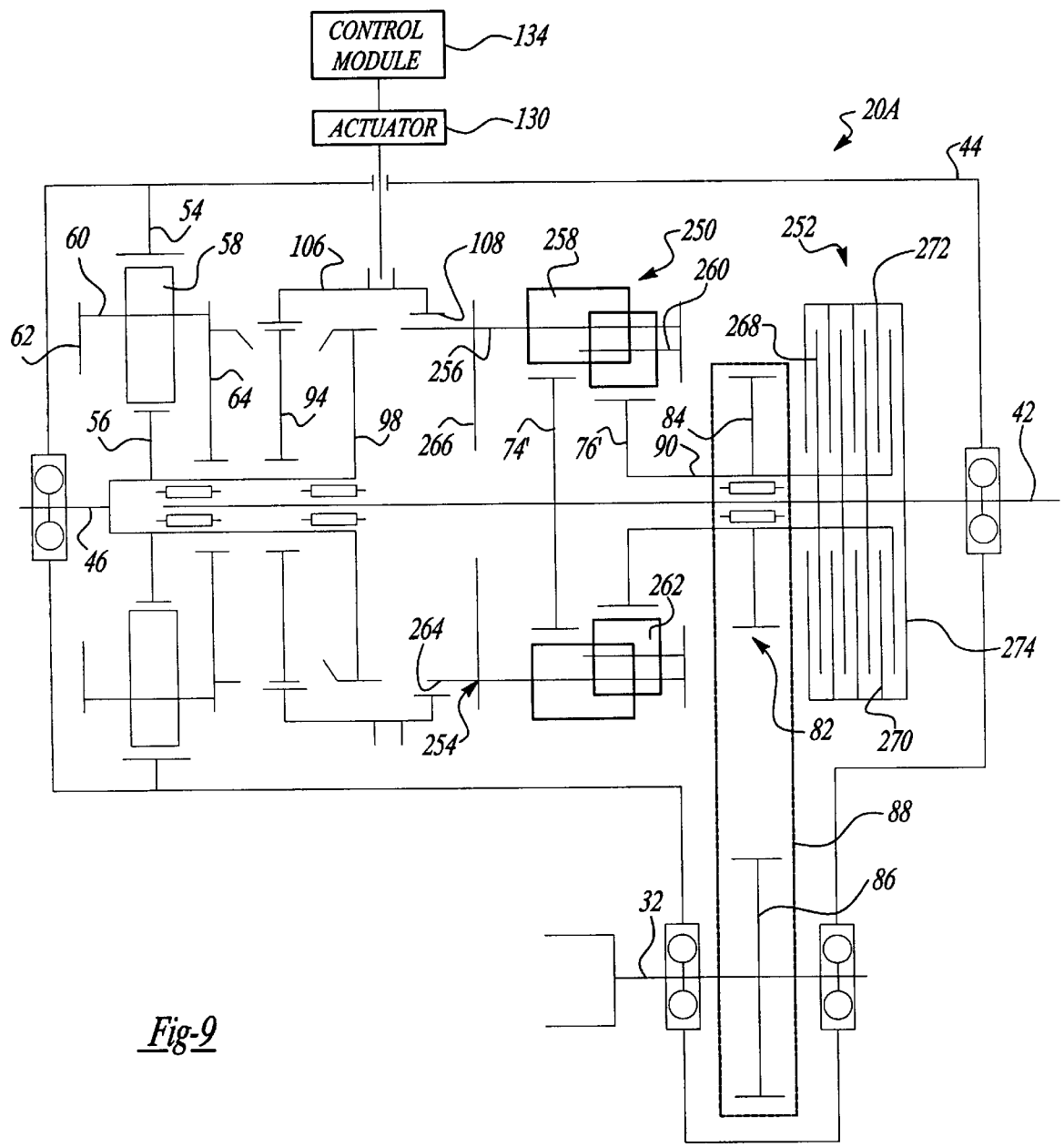
FIG. 9 is a schematic illustration of a transfer case according to an alternative embodiment of the present invention.

Referring to FIG. 9, a modified version of transfer case 20, identified as transfer case 20A, is shown equipped with a drive assembly including an interaxle differential 250 and a biasing clutch 252. Differential 250 includes a carrier assembly 254 having long pinion shafts 256 on which long pinions 258 are rotatably supported, and short pinion shafts 260 on which short pinions 262 are rotatably supported. Long pinions 258 mesh with second sun gear 74' and short pinions 262 mesh with third sun gear 76'. Pairs of long pinions 258 and short pinions 262 are meshed. As such, torque delivered to carrier assembly 254 via range sleeve 106 is delivered to rear output shaft 42 and front output shaft 32 through sun gears 74' and 76' while facilitating speed differentiation to establish the full-time four-wheel drive modes. As seen, teeth 108 on range sleeve 106 are maintained in constant meshed engagement with external teeth 264 formed on a front carrier plate 266 of carrier assembly 254. Thus, movement of range sleeve 106 between its H, N and L positions establish the high-range, neutral and low-range speed ratios previously described.

To provide means for controlling torque distribution and speed differentiation between front and rear output shafts 32 and 42, respectively, transfer case 20A includes biasing clutch 252. Biasing clutch 252 is normally operable in a non-actuated mode for permitting speed differentiation between front output shaft 32 and rear output shaft 42, thereby establishing the full-time four-wheel drive mode. Biasing clutch 252 is also operable in a fully-actuated mode for establishing the locked four-wheel drive mode in which speed differentiation is inhibited between front output shaft 32 and rear output shaft 42. Biasing clutch 252 progressively regulates the torque bias and speed differentiation between its non-actuated and fully-actuated modes in response to and as a function of the amount of relative rotation (i.e., interaxle slip) between front output shaft 32 and rear output shaft 42.

The torque versus slip characteristics of biasing clutch 252 can be tuned to meet specific vehicular applications. Biasing clutch 252 is a hydromechanical torque transfer coupling and includes a clutch pack having alternately interleaved clutch plates 268 and 270 mounted respectively for rotation with a drum 272 and transfer shaft 90. Drum 272 includes a rear end plate 274 that is fixed to rear output shaft 42. A clutch engagement force operable for transferring torque to the slower turning clutch plate, can, for example, be generated in response to viscous shear (i.e., viscous couplings), hydraulic pressure (i.e., geared traction units) or in any other manner known in torque transfer couplings. If desired, a mechanically-actuated lock-out mechanism could be positioned between drum 272 and rear output shaft 42 for selectively preventing rotation therebetween and permitting selection of either full-time or locked four-wheel drive modes.

Figure 10:
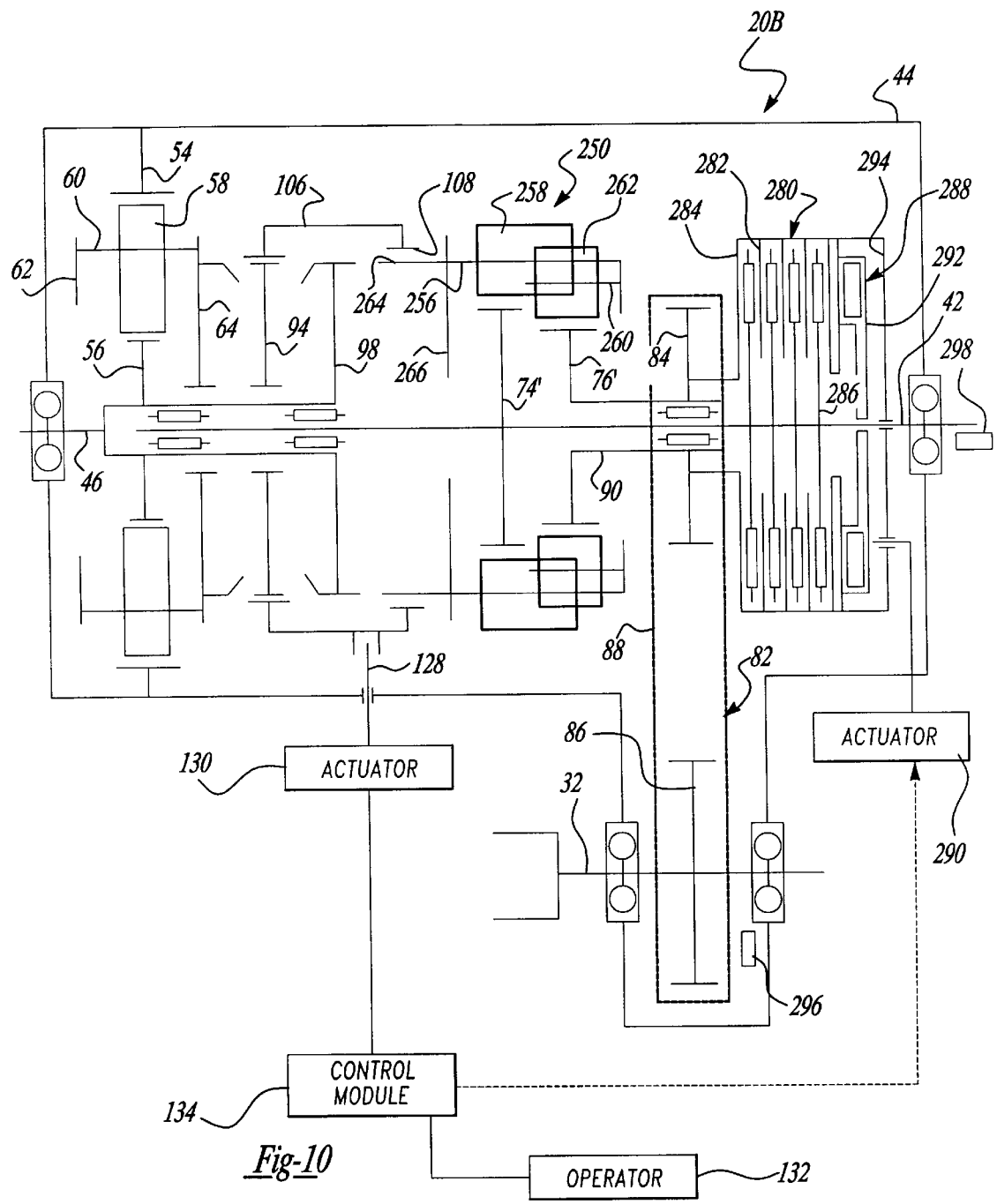
FIG. 10 is a schematic illustration of a modified version of the transfer case shown in FIG. 9.

FIG. 10 illustrates a transfer case 20B which is a modified version of transfer case 20A. In particular, transfer case 20B is equipped with a biasing clutch 280 having a set of outer clutch plates 282 fixed to a drum assembly 284 which is fixed for rotation with drive sprocket 84, and a set of inner clutch plates 286 fixed for rotation with rear output shaft 42 and alternatively interleaved with outer clutch plates 282 to define a clutch pack. Biasing clutch 280 further includes a thrust mechanism 288 for exerting a clutch engagement force on the clutch pack, and an actuator 290 acting on thrust mechanism 288 for controlling the magnitude of the clutch engagement force as a function of the amount of interaxle slip. Thrust mechanism 288 includes an apply plate 292 which is axially movable relative to the clutch pack. Apply plate 292 can be a piston, lever arm, cam rings or any other suitable device. According to one embodiment, actuator 290 is a pump which supplies high pressure hydraulic fluid from a sump within housing 44 to pressure chamber 294 for controlling the axial position of apply plate 292 relative to the clutch pack and, as such, the clutch engagement force exerted thereon. The pump can be a shaft driven device, such as a gerotor pump or a gear pump, in which the output pressure generated and supplied to pressure chamber 294 is proportional to the speed difference between front output shaft 32 and rear output shaft 42. With such a shaft-driven pump, the position of apply plate 292 in pressure chamber 294 and the clutch engagement force exerted on the clutch pack is progressive and is likewise generally proportional to the speed difference between output shafts 32 and 42.

As an alternative, actuator 290 can be an electrically-controlled device which is controlled by transfer case shift control system 150. In operation, transfer case control module 134 would determine the real time value of the speed difference from input signals supplied by front and rear speed sensors 296 and 298 and send a control signal to actuator 290 for regulating the clutch engagement force exerted on the clutch pack by thrust mechanism 288 as a function of the control signal. Electrically-controlled actuator 290 could be an electromagnetic solenoid operable for moving apply plate 292 in proportion to the electrical power supplied to its coil. As a further option, actuator 290 could be an electric pump with its output pressure regulated. Moreover, if transfer case 20B is equipped with electrically-controlled actuator 290, then mode select operator 132 can permit the vehicle driver to select between full-time four-wheel high-range and low-range modes with automatic clutch control, locked four-wheel high-range and low-range drive modes, and the Neutral mode.

Figure 11:
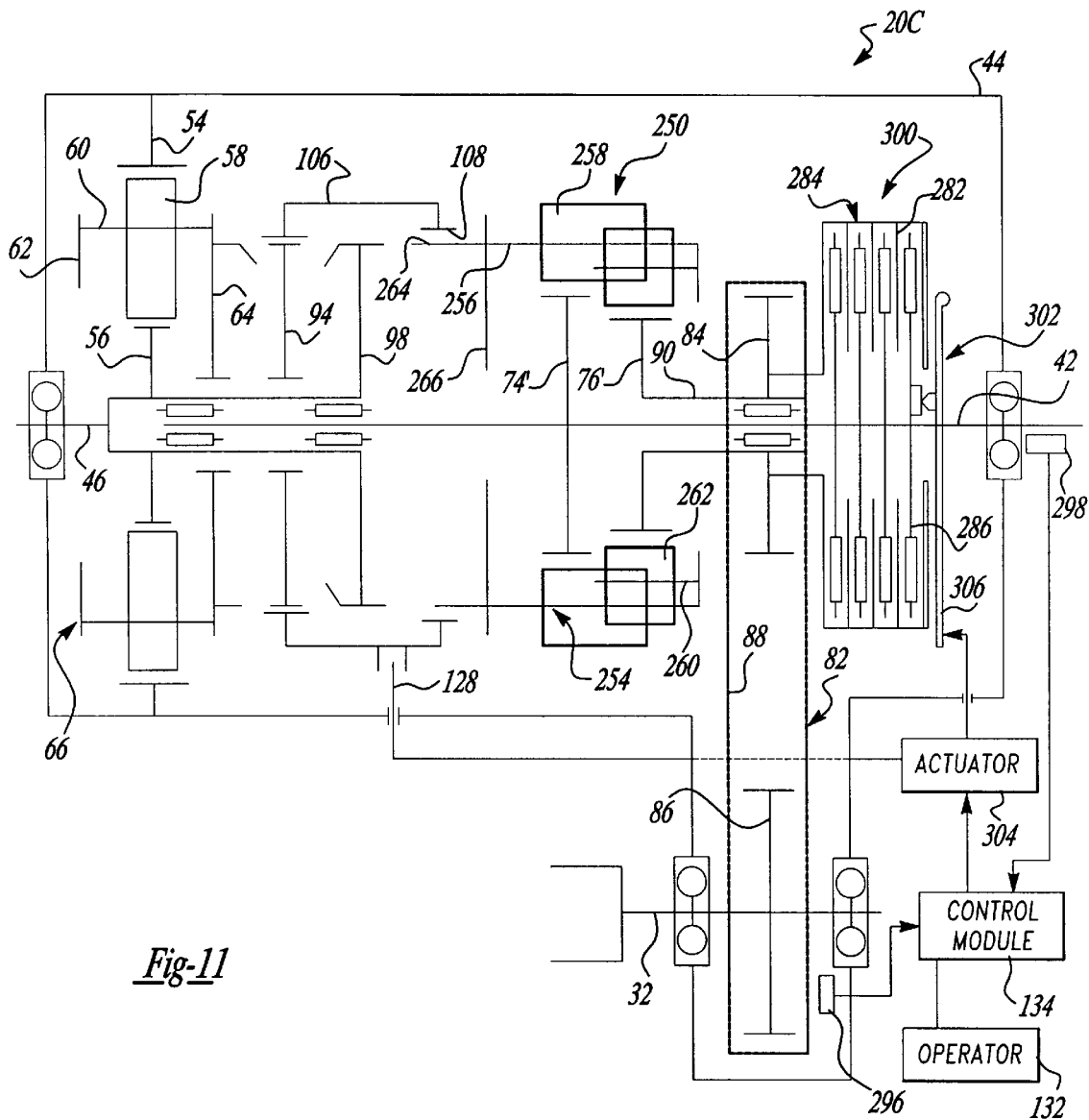
FIG. 11 is a schematic illustration of another modified version of the transfer case shown in FIG. 9.

FIG. 11 illustrates a transfer case 20C equipped with a mechanically-actuated biasing clutch 300. In particular, biasing clutch 300 is an electronically-controlled clutch assembly operably disposed between front output shaft 32 and rear output shaft 42 to automatically control the magnitude of the speed differentiation and modify the torque distribution ratio therebetween. Biasing clutch 300 has a thrust mechanism 302 for exerting a clutch engagement force on the clutch pack with an actuator 304 controlling the magnitude of the clutch engagement force as a function of the value of interaxle slip. In particular, thrust mechanism 302 includes a pivotable lever arm assembly 306. Again, transfer case module 134 controls the frictional biasing applied by biasing clutch 300 in response to a control signal generated based on the value of the sensor input signals. Preferably, actuator 304 facilitates coordinated movement of range sleeve 106 and lever arm assembly 306 to permit the vehicle operator to select, via actuation of operator 132, full-time four-wheel high-range and low-range drive modes, a neutral mode, and locked four-wheel high-range and low-range drive modes.

Figure 12:
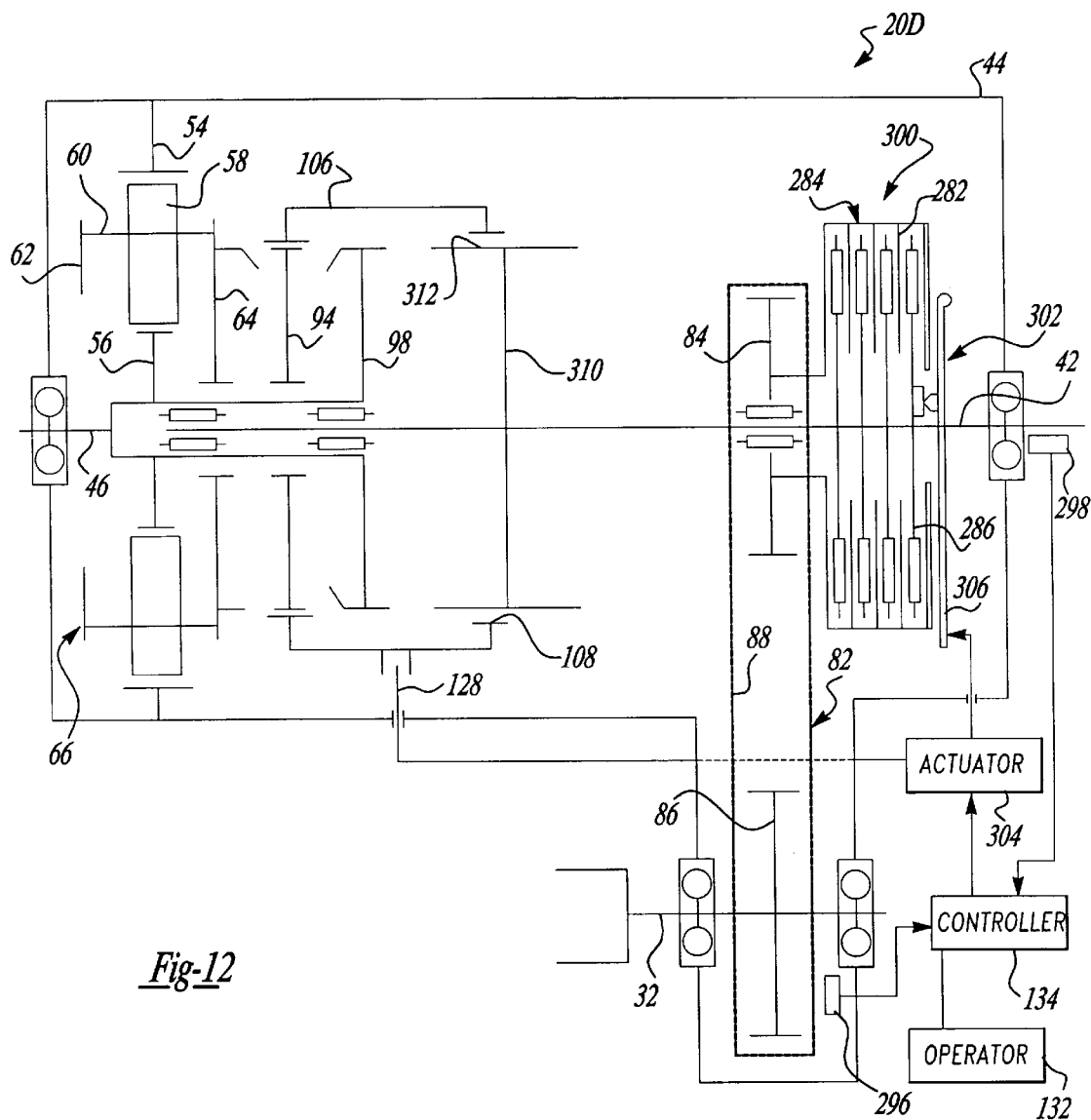
FIG. 12 is a schematic illustration of a modified version of the transfer case shown in FIG. 11.

FIG. 12 illustrates a transfer case 20D wherein planetary gear assembly 48 and synchronized range shift mechanism 50 are installed in an "on-demand" four-wheel drive arrangement with transfer clutch 300 installed to transfer drive torque from rear output shaft 42 to front output shaft 32 in response to low traction conditions. In this arrangement, interaxle differential 250 is replaced with a driven hub 310 fixed for rotation with rear output shaft 42 and having external teeth 312 in constant mesh with teeth 108 on range sleeve 106. As such, range sleeve 106 is movable to establish the high-range and low-range drive connections between rear output shaft 42 and input shaft 46. Transfer clutch 300 is again controlled automatically, as previously described. If the vehicle operator selects a two-wheel drive mode, transfer clutch 300 is maintained in its non-actuated state and all drive torque is delivered to rear output shaft 42. When a part-time four-wheel drive mode is selected, transfer clutch 300 is held in its fully actuated state and front output shaft 32 is effectively locked for rotation with rear output shaft 42. When an on-demand mode is selected, transfer case control module 134 regulates the torque transferred to front output shaft 32 by varying transfer clutch 230 between its non-actuated and fully-actuated states.

Figure 13:
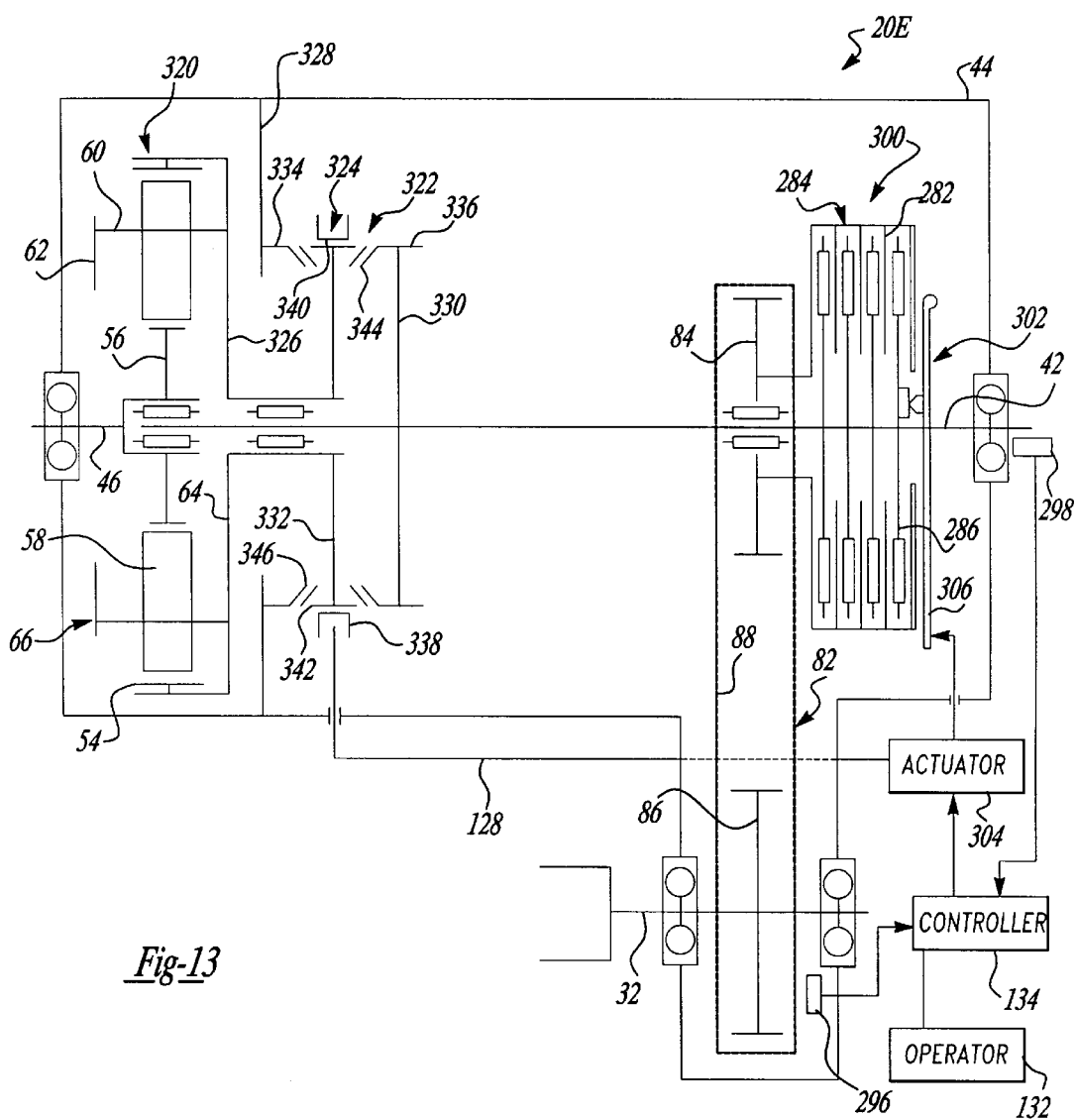
FIG. 13 is a schematic illustration of an alternative construction for the planetary gear assembly and range shift mechanism which can be used with any of the transfer case of the present invention.

Referring now to FIG. 13, transfer case 20E is shown equipped with a planetary gearset 320 and a synchronized range shift mechanism 322 in place of gearset 48 and shift mechanism 50 of the previous drawings. In this regard, gearset 320 and range shift mechanism 322 are adapted for use in any of the various transfer case embodiments disclosed herein as well as in other suitable transfer cases. Planetary gearset 320 is a two-speed gear reduction unit which, in conjunction with a range clutch 324 of synchronized range shift mechanism 322 is operable to establish either of first and second drive connections between input shaft 46 and rear output shaft 42. Planetary gearset includes a sun gear 56 fixed for rotation with input shaft 46, pinions 58 rotatably supported by shafts 60 on planet carrier 66, and a ring gear 54 fixed to a bell housing 326 rotatably supported on rear output shaft 42. Rear carrier ring 64 is fixed for rotation with rear output shaft 42. Synchronized range shift mechanism 322 includes a brake plate 328 fixed to housing 44, a drive hub 330 fixed to rear output shaft 42, and a clutch hub 332 fixed to bell housing 326. Brake plate 328 includes clutch teeth 334 and drive hub 330 includes clutch teeth 336. Range clutch 324 includes a range sleeve 338 having clutch teeth 340 in constant mesh with spline teeth 342 on clutch hub 332, a first synchronizer assembly 344 disposed between clutch hub 332 and drive hub 330, and a second synchronizer assembly 346 disposed between clutch hub 332 and brake plate 328.

Upon movement of range sleeve 338 from its neutral position shown toward its high-range ("H") position, first synchronizer assembly 344 functions to cause speed synchronization between ring gear 54 and drive hub 330. Thereafter, clutch teeth 340 of range sleeve 338 meshingly engage clutch teeth 336 on drive hub 330 for coupling ring gear 54 for rotation with drive hub 330. This establishes a first drive connection between input shaft 46 and rear output shaft 42 wherein rear output shaft 42 is driven at a first speed ratio relative to input shaft 46 to establish the high-range drive mode. Similarly, movement of range sleeve 338 toward its low-range ("L") position causes send synchronizer assembly 346 to brake rotation of ring gear 54. Thereafter, clutch teeth 340 on range sleeve 338 engage clutch teeth 334 on brake plate 328. This establishes a second drive connection wherein rear output shaft 42 is driven at a second speed ratio relative to input shaft 46 to establish the low-range drive mode. If incorporated into the full-time four-wheel drive arrangements of FIGS. 2, 9, 10 and 11, the above-described on-the-move shift system would be slightly modified by coupling carrier ring 64 and drive hub 330 to a quill shaft rotatably supported on rear output shaft 42 with the quill shaft acting as the input member to the interaxle differentials. Finally, practitioners skilled in the art will recognize that the shift on-the-move systems shown associated with the full-time and on-demand transfer cases disclosed herein could also be used in association with part-time transfer cases wherein the differentials and/or biasing clutches would be replaced with a mode clutch operable for mechanically coupling drive sprocket 84 to rear output shaft 42 for shifting between two-wheel and part-time four-wheel drive modes.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A four-wheel drive system for a motor vehicle having an engine and a transmission providing drive torque to first and second drivelines, the system comprising:

a transfer case having an input shaft receiving drive torque from the engine and transmission, a first output shaft connected to the first driveline, a second output shaft connected to the second driveline, a gear reduction unit driven by said input shaft, a range clutch for establishing first and second drive connections between said gear reduction unit and at least one of said first and second output shafts so as to define high-range and low-range drive modes, and an actuator for actuating said range clutch;

a mode selector for generating a mode signal indicative of the selected drive mode;

a powertrain control module controlling a fuel system and an ignition system of the engine;

a relay circuit interconnected between the fuel and ignition systems and said powertrain control module; and a transfer case control module receiving said mode signal and operable for sending a control signal to said relay circuit for controlling the fuel and ignition systems of the engine to modify the drive torque supplied to said input shaft and sending a shift signal to said actuator for causing said range clutch to establish the selected one of said high-range and low-range drive modes.

2. The four-wheel drive system of claim 1 wherein said transfer case further comprises an interaxle differential having an input, a first output coupled to said first output shaft, a second output coupled to said second output shaft, and a gearset coupling said input to said first and second outputs, and wherein said range clutch is operable for establishing said first and second drive connections between said gear reduction unit and said input.

3. The four-wheel drive system of claim 1 wherein said relay circuit is an automatic shutdown relay and said transfer case control module is operable to control the output of said automatic shutdown relay which is supplied to the fuel and ignition systems of the engine.

4. The four-wheel drive system of claim 3 wherein said output of said automatic shutdown relay is pulsed to control electrical power supplied to the fuel and ignition systems of the engine.

5. The four-wheel drive system of claim 3 wherein said transfer case control module receives an input signal indicative of vehicle speed, and wherein said control signal is a pulsewidth modulated electrical signal with a frequency which increases in relation to decreases in said vehicle speed.

6. The four-wheel drive system of claim 3 wherein said transfer case control module receives an input signal indicative of throttle position, and wherein said control signal is a pulsewidth modulated electrical signal with a duty cycle which increases in relation to increases in throttle position.

7. The four-wheel drive system of claim 3 wherein said transfer case control module receives an input signal indicative of vehicle speed and is operable for signalling said powertrain control module to shift said transmission into neutral if said mode signal is received when said vehicle speed is less than a predetermined value.

8. The four-wheel drive system of claim 1 wherein said gear reduction unit is a planetary gear assembly including a stationary ring gear, a sun gear fixed for rotation with said input shaft, a carrier, a pinion gear rotatably supported from said carrier and meshed with said ring gear and said sun gear, a clutch plate fixed for rotation with said input shaft, a clutch hub rotatably supported between said carrier and said clutch plate, and wherein said range clutch includes a range sleeve having a first segment coupled for rotation with said clutch hub and a second segment coupled for rotation with an output member transferring drive torque to one of said output shafts, said range sleeve is operable in a first position to engage said clutch plate and establish said first drive connection such that said output member is driven by said input shaft at a first speed ratio, and said range sleeve is operable in a second position to engage said carrier and establish said second drive connection such that said output member is driven by said input shaft at a second speed ratio.

9. The four-wheel drive system of claim 8 wherein said gear reduction unit further comprises a first synchronizer operable for synchronizing the rotary speed of said output member to that of said clutch plate in response to movement of said range sleeve to its first position, a second synchronizer operable for synchronizing the rotary speed of said output member to said carrier in response to movement of said range sleeve to its second position, and a shift member connected to said actuator for moving said range sleeve between its first and second positions in response to actuation of said actuator.

10. The four-wheel drive system of claim 8 wherein said output member is a drive hub fixed for rotation with said first output shaft.

11. The four-wheel drive system of claim 8 wherein said output member is a carrier of an interaxle differential having a gearset driven by said carrier and which is coupled to said first and second output shafts.

12. A method for shifting between high-range and low-range drive modes provided by a transfer case in a four-wheel drive vehicle having an engine including fuel and ignition systems and which supplies drive torque to the transfer case, comprising the steps of:

providing a mode selector for generating a mode signal indicating a request to shift from the current one of said high-range and low-range drive modes to a selected drive mode;

providing a powertrain control module for monitoring and controlling operation of said fuel and ignition systems;

providing an interruptable circuit between at least one of said fuel and ignition systems and said powertrain control module;

supplying said mode signal to a transfer case control module;

supplying an input signal to said transfer case control module indicating whether a throttle for said vehicle is open or closed; and supplying a shift signal from said transfer case control module to said transfer case for shifting into said selected drive mode when said throttle is closed, otherwise supplying a control signal to said interruptable circuit for controlling operation of said fuel and ignition systems to modify the drive torque supplied to said transfer case and then supplying said shift signal to said transfer case.

13. The method of claim 12 wherein said step of providing an interruptable circuit includes connecting a relay circuit between at least one of said fuel and ignition systems and said powertrain control module, and wherein said control signal operates to pulse the output of said relay circuit to modify the drive torque supply to said transfer case.

14. The method of claim 12 further comprising the step of controlling the magnitude of said control signal for returning said torque supply to its previous value following completion of said shift into said selected drive mode.

15. The method of claim 12 wherein said step of supplying a control signal to said interruptable circuit includes providing a pulsewidth modulated electrical signal having a duty cycle which increases in relation to increases in throttle opening.

16. The method of claim 15 further comprising the step of supplying an input signal to said transfer case control module corresponding to vehicle speed, the frequency of said pulsewidth modulated electrical signal increasing in relation to decrease in vehicle speed.

17. The method of claim 12 further comprising the steps of:

supplying input signals to said transfer case control module corresponding to vehicle speed and gear position of a transmission interconnected between said engine and said transfer case;

determining in said transfer case control module whether said vehicle speed is in a first speed range or in a second speed range;

supplying a shift signal from said transfer case control module to said transfer case for shifting into said selected drive mode when said vehicle speed is in said first range and said transmission is in neutral, otherwise supplying a signal to said powertrain control module for shifting said transmission into neutral prior to supplying said shift signal to said transfer case.

18. The method of claim 17 wherein said step of supplying a control signal to said interruptable circuit is only performed when said vehicle speed is in said second speed range.

19. A method for shifting a two-speed transfer case between a high-range drive mode and a low-range drive mode, said transfer case operable for transferring drive torque from an engine and a transmission to front and rear drivelines of a motor vehicle, said method comprising the steps of:

detecting a vehicle speed;

detecting a throttle position;

generating a control signal based on said vehicle speed and said throttle position;

providing a relay circuit between fuel and ignition systems of the engine and a powertrain control module monitoring and controlling operation thereof;

sending said control signal to said relay circuit for modifying operation of said fuel and ignition systems independent of said powertrain control module for modifying the drive torque delivered to said transfer case; and shifting said transfer case between the high-range and low-range drive modes.

20. The method of claim 19 wherein said control signal is further defined as a pulsewidth modulated electrical signal such that the frequency of said control signal increases in relation to decreases in vehicle speed.

21. The method of claim 19 wherein said control signal is further defined as a pulsewidth modulated electrical signal such that the duty-cycle of said control signal increases in relation to increases in throttle position.

22. The method of claim 21 further comprising the step of gradually reducing the duty-cycle of said control signal over a time period, thereby restoring drive torque after said step of shifting the transfer case into one of said high-range and low-range drive modes.

* * * * *